(12) United States Patent
Corley et al.

(10) Patent No.: US 10,191,954 B1
(45) Date of Patent: *Jan. 29, 2019

(54) PRIORITIZED TRANSCODING OF MEDIA CONTENT

(75) Inventors: Jonathan B. Corley, Seattle, WA (US); Tal Saraf, Seattle, WA (US); Bradley E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 130 days.

This patent is subject to a terminal disclaimer.

(21) Appl. No.: 13/465,987

(22) Filed: May 7, 2012

(51) Int. Cl.
*G06F 7/00* (2006.01)
*G06F 17/30* (2006.01)

(52) U.S. Cl.
CPC .............................. *G06F 17/30569* (2013.01)

(58) Field of Classification Search
CPC ................................................ G06F 17/30386
USPC ................... 707/999.101, 999.102, 736, 720
See application file for complete search history.

(56) References Cited

U.S. PATENT DOCUMENTS

| | | | |
|---|---|---|---|
| 5,541,852 A | 7/1996 | Eyuboglu et al. | |
| 6,732,332 B1 | 5/2004 | Borysewicz et al. | |
| 6,970,602 B1 | 11/2005 | Smith et al. | |
| 7,231,023 B1 | 6/2007 | Begeja et al. | |
| 7,761,900 B2 | 7/2010 | Crayford | |
| 7,958,532 B2 | 6/2011 | Paul et al. | |
| 8,634,705 B2 | 1/2014 | Yogeshwar et al. | |
| 8,855,189 B1 * | 10/2014 | Krause | H04N 21/234309 370/307 |
| 9,078,091 B2 | 7/2015 | Lehtiniemi et al. | |
| 9,088,634 B1 | 7/2015 | Corley et al. | |
| 9,183,049 B1 | 11/2015 | Corley | |
| 9,189,484 B1 | 11/2015 | Velummylum | |
| 9,223,621 B1 | 12/2015 | Corley | |
| 9,292,896 B1 | 3/2016 | Corley | |
| 9,380,326 B1 | 6/2016 | Corley | |
| 9,483,785 B1 * | 11/2016 | Corley | G06Q 30/0613 |
| 9,497,496 B1 | 11/2016 | Corley | |

(Continued)

OTHER PUBLICATIONS

Non-Final Office Action issued in U.S. Appl. No. 13/465,944 dated Sep. 24, 2014, 23 pages.

(Continued)

*Primary Examiner* — Eliyah S. Harper
(74) *Attorney, Agent, or Firm* — Hogan Lovells US LLP

(57) ABSTRACT

A service is described that is able to analyze and prioritize media transcoding jobs. The determination of priority may be based on a feedback loop in which the system obtains request pattern information that indicates how end user devices consume the media content that has been transcoded. The historical request pattern information can be obtained by the service provider during the serving of the content to the requesting devices. Alternatively, the request pattern information may be obtained by receiving the information from a content publisher or other entities. Based on the request pattern associated with the media content, the system may assign higher priorities to formats that will be most frequently requested at specified time periods. The system may utilize higher number of resources, different types of resources or different configurations of resources to execute the high priority transcoding jobs.

23 Claims, 5 Drawing Sheets

(56) References Cited

U.S. PATENT DOCUMENTS

| | | | |
|---|---|---|---|
| 9,510,033 B1 | 11/2016 | Corley | |
| 2002/0150247 A1 | 10/2002 | Linnartz et al. | |
| 2002/0170035 A1 | 11/2002 | Casati et al. | |
| 2006/0168630 A1 | 7/2006 | Davies | |
| 2007/0106622 A1 | 5/2007 | Boomershine | |
| 2007/0157260 A1 | 7/2007 | Walker | |
| 2007/0162945 A1 | 7/2007 | Mills | |
| 2007/0174338 A1 | 7/2007 | Liggett | |
| 2008/0034393 A1 | 2/2008 | Crayford | |
| 2008/0081648 A1* | 4/2008 | Kang | H04M 7/0072 455/500 |
| 2008/0205510 A1 | 8/2008 | Komi et al. | |
| 2008/0242280 A1 | 10/2008 | Shapiro et al. | |
| 2008/0301588 A1 | 12/2008 | Kumar et al. | |
| 2009/0043888 A1 | 2/2009 | Jackson | |
| 2009/0083279 A1* | 3/2009 | Hasek | 707/10 |
| 2009/0172685 A1* | 7/2009 | Shavit | G06F 9/4881 718/103 |
| 2009/0254672 A1* | 10/2009 | Zhang | H04N 21/23106 709/231 |
| 2009/0276266 A1 | 11/2009 | Nishiyama | |
| 2009/0276716 A1* | 11/2009 | Chua | 715/744 |
| 2010/0017516 A1 | 1/2010 | Sparrell et al. | |
| 2010/0054148 A1 | 3/2010 | Murakami et al. | |
| 2010/0076805 A1 | 3/2010 | Batsakis et al. | |
| 2010/0088505 A1 | 4/2010 | Coppola et al. | |
| 2010/0131674 A1* | 5/2010 | Vecchio | H04N 21/2662 709/246 |
| 2010/0195540 A1 | 8/2010 | Kerr et al. | |
| 2010/0199299 A1 | 8/2010 | Chang et al. | |
| 2010/0205616 A1 | 8/2010 | Lai et al. | |
| 2010/0250710 A1 | 9/2010 | Cadwell et al. | |
| 2010/0281042 A1 | 11/2010 | Windes et al. | |
| 2010/0309794 A1 | 12/2010 | Keynan et al. | |
| 2010/0332262 A1 | 12/2010 | Horvitz et al. | |
| 2011/0019870 A1 | 1/2011 | Ballocca et al. | |
| 2011/0082962 A1 | 4/2011 | Horovitz et al. | |
| 2011/0088076 A1 | 4/2011 | Li et al. | |
| 2011/0153628 A1 | 6/2011 | Basu et al. | |
| 2011/0197221 A1 | 8/2011 | Rouse et al. | |
| 2011/0209162 A1 | 8/2011 | Machiraju et al. | |
| 2011/0310995 A1* | 12/2011 | Dougherty, III | G02B 27/22 375/295 |
| 2011/0313982 A1 | 12/2011 | Kranendonk et al. | |
| 2011/0314093 A1 | 12/2011 | Sheu et al. | |
| 2012/0030341 A1 | 2/2012 | Jensen et al. | |
| 2012/0030376 A1* | 2/2012 | Lemus | H04N 19/0023 709/246 |
| 2012/0072542 A1* | 3/2012 | McGowan | 709/219 |
| 2012/0079054 A1* | 3/2012 | Moroney | H04N 21/4126 709/213 |
| 2012/0089687 A1 | 4/2012 | Katz | |
| 2012/0102154 A1 | 4/2012 | Huang et al. | |
| 2012/0131591 A1 | 5/2012 | Moorthi | |
| 2012/0158645 A1 | 6/2012 | Shafiee et al. | |
| 2012/0159494 A1 | 6/2012 | Shafiee et al. | |
| 2012/0159503 A1 | 6/2012 | Shafiee et al. | |
| 2012/0192239 A1 | 7/2012 | Harwell et al. | |
| 2012/0209942 A1 | 8/2012 | Zehavi et al. | |
| 2012/0236201 A1 | 9/2012 | Larsen et al. | |
| 2012/0254456 A1 | 10/2012 | Visharam et al. | |
| 2012/0265847 A1 | 10/2012 | Swenson et al. | |
| 2012/0278441 A1 | 11/2012 | Li et al. | |
| 2012/0331089 A1* | 12/2012 | Vonog | H04L 67/2823 709/217 |
| 2013/0019311 A1 | 1/2013 | Swildens | |
| 2013/0054827 A1 | 2/2013 | Feher et al. | |
| 2014/0258441 A1 | 9/2014 | L'Heureux | |
| 2014/0359092 A1 | 12/2014 | Middleton | |

OTHER PUBLICATIONS

Final Office Action issued in U.S. Appl. No. 13/465,975 dated Sep. 11, 2014, 48 pages.
Final Office Action issued in U.S. Appl. No. 13/465,978 dated Jul. 3, 2014, 26 pages.
Non-Final Office Action issued in U.S. Appl. No. 13/465,992 dated Jul. 29, 2014, 32 pages.
Non-Final Office Action issued in U.S. Appl. No. 13/465,997 dated Oct. 21, 2014, 14 pages.
Non-Final Office Action issued in U.S. Appl. No. 13/466,002 dated Sep. 23, 2014, 12 pages.
Non-Final Office Action issued in U.S. Appl. No. 13/465,975 dated Feb. 4, 2014.
Non-Final Office Action issued in U.S. Appl. No. 13/465,978 dated Feb. 4, 2014.
Non-Final Office Action issued in U.S. Appl. No. 13/465,997 dated May 1, 2014.
Non-Final Office Action issued in U.S. Appl. No. 13/466,002 dated Jan. 3, 2013.
Final Office Action issued in U.S. Appl. No. 13/466,002 dated Jul. 19, 2013.
"Non Final Office Action dated Nov. 17, 2016" received in U.S. Appl. No. 14/801,784.
"Final Office Action dated Mar. 21, 2016" received in U.S. Appl. No. 13/465,944.
"Notice of Allowance dated Jul. 20, 2016" received in U.S. Appl. No. 13/465,944.
"Final Office Action dated Jun. 3, 2016" received in U.S. Appl. No. 13/465,960.
"Notice of Allowance dated Aug. 3, 2016" received in U.S. Appl. No. 13/465,975.
"Non Final Office Action dated Jul. 14, 2016" received in U.S. Appl. No. 13/465,978.
"Notice of Allowance dated Mar. 8, 2016" received in U.S. Appl. No. 13/465,992.
"Notice of Allowance dated Jul. 20, 2016" received in U.S. Appl. No. 13/466,002.
"Non Final Office Action dated Feb. 9, 2016" received in U.S. Appl. No. 13/466,002.
"Non Final Office Action dated Dec. 4, 2014" received in U.S. Appl. No. 13/465,931.
"Notice of Allowance dated Mar. 27, 2015" received in U.S. Appl. No. 13/465,931.
"Final Office Action dated Feb. 20, 2015" received in U.S. Appl. No. 13/465,944.
"Non Final Office Action dated Jul. 31, 2015" received in U.S. Appl. No. 13/465,944.
"Non Final Office Action dated Oct. 22, 2015" received in U.S. Appl. No. 13/465,960.
"Non Final Office Action dated Jan. 16, 2015" received in U.S. Appl. No. 13/465,975.
"Final Office Action dated Sep. 8, 2015" received in U.S. Appl. No. 13/465,975.
"Non Final Office Action dated Jan. 29, 2015" received in U.S. Appl. No. 13/465,978.
"Final Office Action dated Aug. 27, 2015" received in U.S. Appl. No. 13/465,978.
"Final Office Action dated Feb. 23, 2015" received in U.S. Appl. No. 13/465,992.
"Non Final Office Action dated Jul. 14, 2015" received in U.S. Appl. No. 13/465,992.
"Software." The Authoritative Dictionary of IEEE Standard Terms. 7$^{th}$ ed. 2000, pp. 1067.
"Non Final Office Action dated Jun. 5, 2015" received in U.S. Appl. No. 14/682,004.
"Notice of Allowance dated Nov. 20, 2015" received in U.S. Appl. No. 14/682,004.
"Final Office Action dated Apr. 8, 2015" received in U.S. Appl. No. 13/466,002.
"Final Office Action dated Jun. 16, 2017" received in U.S. Appl. No. 14/801,784.

(56) References Cited

OTHER PUBLICATIONS

"Non-Final Office Action dated Oct. 26, 2017" received in U.S. Appl. No. 13/465,960.
"Non-Final Office Action dated Jun. 2, 2017" received in U.S. Appl. No. 15/362,617.
"Notice of Allowance dated Mar. 27, 2017" received in U.S. Appl. No. 13/465,978.
"Non-Final Office Action dated Mar. 26, 2018" received in U.S. Appl. No. 14/801,784.
"Final Office Action dated Dec. 28, 2017" received in U.S. Appl. No. 15/362,617.

* cited by examiner

PRIORITIZED TRANSCODING OF MEDIA CONTENT

BACKGROUND

In recent years, there has been a surge of development and releases of new types of mobile devices made available to the public. Today's consumer is often equipped with a smart phone, tablet, MP3 player or other device that can be used to access the internet, download and view digital media (e.g. video and audio files), and perform a wide variety of other functions. Given such large numbers of devices and device types, it is quickly becoming a non-trivial task to make media content available to all of the consumers across their various devices. In fact, many companies are spending large fractions of their time and resources managing, scaling and maintaining media processing systems that may have nothing to do with their core business. These companies are looking for encoding systems and services that can provide the best video/audio quality to consumers at a low cost. Because digital video (and audio) content is often delivered to multiple device types over unmanaged networks with fluctuating bandwidth, it is desirable to utilize transcoding to produce a version of each asset to accommodate these variants.

Many content providers and distributors are continually serving new content to users. For example, news sites, entertainment studios, television content producers are continuously producing new media content that must be transcoded into a variety of different formats. For these content providers, it is desirable to transcode the media in an optimal way to reach the most of their customers in the minimal amount of time, while saving on the potentially substantial costs incurred for transcoding the media assets. In many cases, simple first-in, first-out (FIFO) scheduling of transcoding jobs across all of the available media is not be the most optimal or efficient technique to be utilized.

BRIEF DESCRIPTION OF THE DRAWINGS

Various embodiments in accordance with the present disclosure will be described with reference to the drawings, in which.

DETAILED DESCRIPTION

Figure 1:
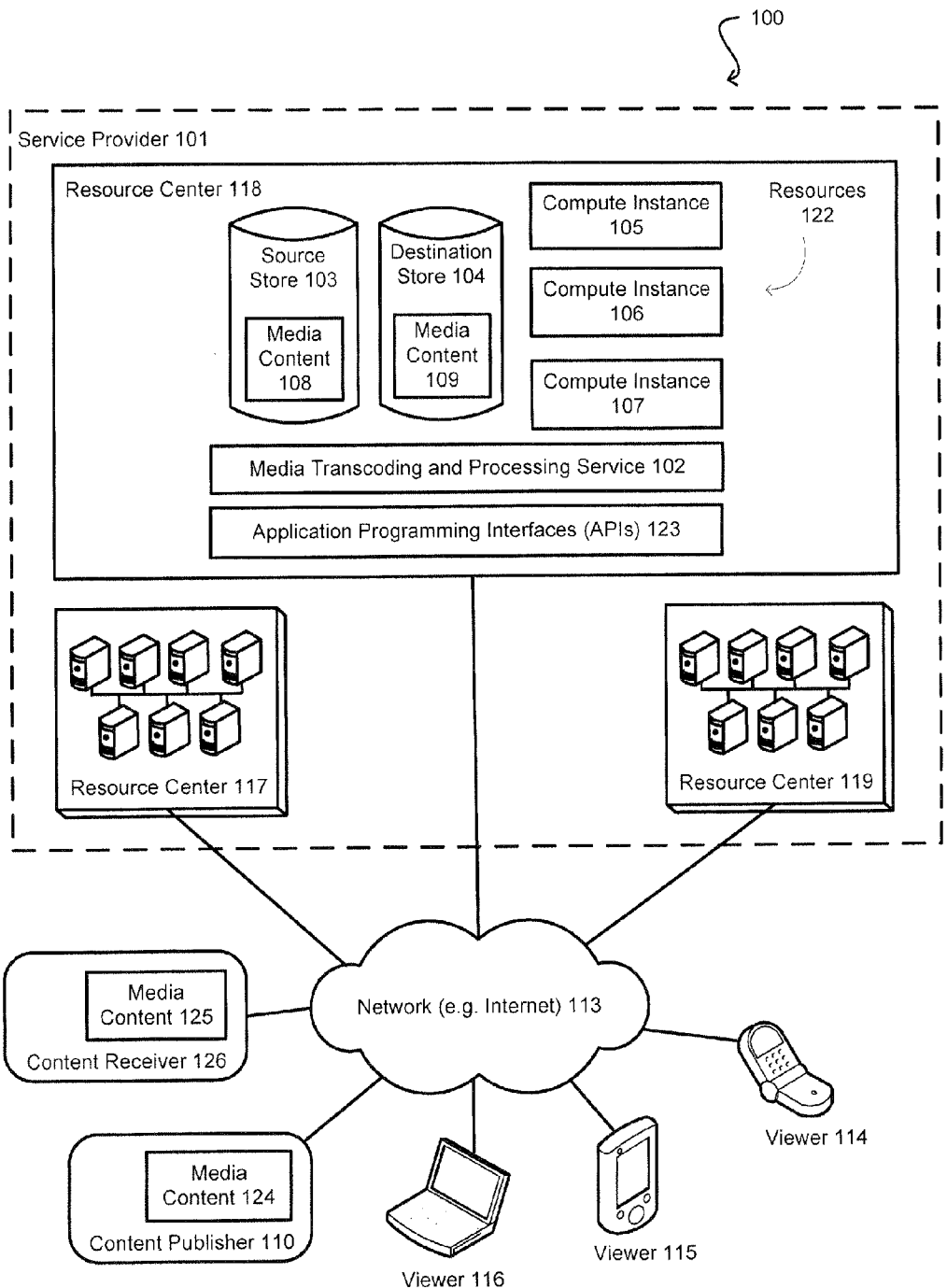
FIG. 1 is a general illustration of an environment in which the transcoding service can be utilized, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for prioritizing the processing of content. In particular, various embodiments provide approaches for prioritizing the transcoding of content, such as media content, based at least in part on the access patterns associated with the media content. While various embodiments are discussed with respect to transcoding, it should be understood that other types of processing can be prioritized as well within the scope of the various embodiments, as may include transmuxing the content, adding security information to the content, translating a portion of the content, adding subtitles to the content, adjusting a resolution or format of the content, adjusting a bit rate to be used for the content, adjusting a version of the content, and the like. Further, information other than access patters can be used for the prioritization as discussed and suggested herein.

In accordance with various embodiments, a service is described that enables the prioritization of transcoding jobs for media content. The media content can be provided by a content publisher to a service provider. Each transcoding job may transcode the media from one encoding format into a different format.

In accordance with an embodiment, the service can analyze and predict which transcodes are going to be more valuable or useful to the content publisher that has provided the media content, and can determine a priority based at least in part upon predicted value and/or usefulness. In some embodiments, a determination of priority may be based on a feedback loop in which the service provider obtains information regarding how the various end users and devices consume (e.g. access, download, etc.) the media content that has been transcoded. This historical access pattern information can be obtained by the service provider during the serving of the content to the various requesting viewers (e.g. end user devices). In some embodiments, the service provider can implement a monitoring component that gathers and analyzes information about what media content is consumed by the end users in order to make predictions for assigning transcoding priorities. For example, it may be that in the morning, the viewers of the content publisher's content consume the content on their mobile phones and only later in the afternoon, view the content on a browser of their personal computers (PCs). In this scenario, if the content is uploaded early in the morning, it may be most important for the content publisher to encode the media into a format for mobile devices (e.g. iPhone®) at the highest possible speed and utilizing the most efficient resources, while encoding for the PC formats may be less urgent. As such, in one embodiment, the system can assign high transcoding priority to the encoding formats associated with mobile devices and a lower priority to the PC formats. In addition, information about the user's environment can be utilized in the prediction, such as connection speed, bandwidth and specific device attributes (e.g. screen size, CPU capacity, etc.).

In an alternative embodiment, the historical pattern information can be obtained from the end user devices without actually serving the media content to the devices. For example, an application on a mobile device can transmit access pattern information to the service provider whenever the mobile device requests the media content from other locations (e.g. third party content providers, etc.). This information can be utilized by the service provider in assigning priorities to the various formats that related content will be transcoded into.

In an alternative embodiment, the historical access pattern information can be provided by the content publisher to the service provider. For example, at the time of requesting the service provider to transcode a media asset (e.g. daily newscast), the content publisher may indicate to the service provider that the viewers of this particular type of media are most likely to request it using their mobile device from the hours of 6 am until 9 am and then are most likely to view it using a browser on a PC thereafter. The service provider can then utilize this information to assign priorities to transcode the media content into the various formats.

According to one embodiment, rather than collecting data associated with the actual viewers of the media content, the system can derive or explicitly receive information about users that are likely to be similar to the content publisher's viewers. For example, a content publisher may be serving content that is very similar to the content of several other content publishers. The system can then analyze the users of the related content publishers to derive a transcoding prioritization for the content based on the related viewing audience.

In accordance with another embodiment, a follow-the-sun approach can be used to prioritize the transcoding of media content. This may be applicable to transcoding media content into certain languages. In many cases, video transcoding is performed separately from the audio transcoding. Because of this, in addition to prioritizing the types and bitrates of the media, the system could further prioritize which languages the audio assets are transcoded first based on prediction of geographic highest demand for the respective language dependent media. For example, if the sun will rise over France next, the system could adjust the priorities to transcode the French version next at a high priority.

FIG. 1 is a general illustration of an environment 100 in which the transcoding service can be utilized, in accordance with various embodiments.

As illustrated, a service provider environment 101 can include a variety of devices and components for receiving and processing requests from various users across one or more networks 113. As discussed, access to these resources can be provided as one or more services, such as Web services. In this example, the service provider environment includes a plurality of resources 122, such as data storage resources and request processing resources, that can be deployed in one or more resource centers (117, 118, 119) in one or more locations and made accessible over the one or more networks 113. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANS), Intranets, Extranets, and the like. The resource centers can include any physical or logical grouping of resources, such as a data center, a server farm, content delivery network (CDN) point-of-presence (POP) and the like.

In accordance with various embodiments, resource centers of the service provider 101 may include various computer servers, data storage machines, network devices and other hardware resources necessary to provide the network-accessible services on behalf of the clients of the service provider. For example, as shown in FIG. 1, the resource centers can include physical servers and other devices located in a particular geographical location, which enable the service provider to transcode, process and/or deliver media content to viewer devices (114, 115, 116). In accordance with an embodiment, a resource center can include media cache servers, transcoding servers, watermarking servers and the like. The view of one of the resource centers 118 is shown in an exploded view to provide further illustration of the types of resources 122 that can be contained in a resource center in accordance with various embodiments. It should be noted that the resources 122 can reside in one resource center or can alternatively be distributed across multiple resource centers.

In accordance with various embodiments, the service provider 101 offers a media transcoding and processing service 102 in addition to many other services discussed herein. In one embodiment, the media transcoding and processing service 102 can perform the transcoding jobs of media content 108, 109 stored in data stores (e.g. source store 103, destination store 104) of the service provider 101. In alternative embodiments, the media transcoding and processing service 102 may perform various other functions, such as transmuxing the media, adding security information (e.g. watermarks) to the media, translating the media or adding subtitles and the like.

In accordance with an embodiment, components of the service provider environment 101 enable a content publisher 110 to provide (e.g. upload) a media file to a source store 103 and to schedule the transcoding jobs to be performed thereon. In various embodiments, the source store 103 may be located on the resource center of the service provider or on a remote system, such as the system of the content publisher 110. As an example, the content publisher 110 can upload content 124, such as a media file, to a source store 103 and specify that a set of selected workflows should be applied to the media file. A workflow can apply a particular profile(s) to the media content. In accordance with an embodiment, a profile contains all the information (e.g. settings, parameters, etc.) that may be necessary to transcode the media content into the specific encoding format for a particular device, operating system, or application. For example, one or more profiles can be provided to transcode certain types of media content into formats suitable for iPhone® IOS, Android®, Microsoft Windows Phone® and other mobile device operating systems. The media transcoding and processing service 102 then carries out the workflow, including potentially transcoding the media content stored on a source store 103 into the appropriate encodings. Once workflow is complete, the resulting media content can be placed into a destination store 104. The destination store may be located on the resource center of the service provider or a remote system, such as the system of the content publisher 110 or other entity, such as the content receiver 126. As such, in this example, the media content located in the destination source has had the workflow applied. From the destination store 104, the media content can be made available to a content receiver 126 or the various viewer devices (114, 115, 116) for download. In alternative embodiments, the processed content could be made available to any other entities, including the content publisher 110 or third party service providers.

It should be noted that the term "transcoding" is often associated with a profile or a workflow in this disclosure; however, the profiles, workflows, and various other processing of content contained in this disclosure are not limited to changing the encoding format of media and, in some embodiments, may not include changing the encoding format at all. For example, a profile or workflow, may include transmuxing, digital watermarking, segmenting, applying access controls, adding meta data, inserting advertisements, translating into various languages, transcribing, changing bit rates, sequencing, changing or adding audio associated with a video, or modifying, customizing, or making compatible various other features of content in any other manner. By way of illustration, one workflow could include segmenting a video file for multi-bitrate support and adding audio to the video file and another workflow could include digital watermarking and applying access controls to the file. In accordance with the present disclosure, transcoding may often be a part of various workflows, but is not a required part of every workflow discussed herein.

In accordance with an embodiment, the transcoding service can execute the transcoding jobs using the compute instances (105, 106, 107) of the service provider. In one embodiment, each compute instance is a virtual server resource or virtual node having a specific processing capacity and memory associated therewith, which allows the service provider to meter the usage of the transcoding service by each client (e.g. the service provider may charge per hour of computing resource consumed). In an alternative embodiment, the compute instances can be actual server machines in the data center 100 maintained by the service provider 101 and leased to its customers (e.g. content publisher 110).

It should be noted that while FIG. 1 illustrates a source store 103 and a destination store 104 located in resource center 118, the locations of such stores are not limited to any particular resource center, server or physical computing device. It will be evident to one of ordinary skill in the art that various stores, storage containers, servers, compute instances, transcoding services and other resources described herein can be located in any resource center or distributed across multiple resource centers or geographical locations, allowing data or content to be replicated across all or some of the devices therein. For example, the resource center 117 could be in Europe, the resource center 118 could be Asia, and the resource center 119 could be in the United States. In various embodiments, the various storage containers, servers, compute instances, transcoding services and other resources described herein could also reside on a single device.

In accordance with various embodiments, the transcoding service 102 can provide content publishers with an automated transcoding and workflow system that is reliable and scalable. The content publishers may define the transcoding parameters on their own or leverage a set of predefined common device profiles that are provided by the service provider. The transcoding service can allow the content publishers to upload content to the storage instance, define a workflow, store the resulting encoded assets on the service provider's system, and deliver their media assets to viewers or others, for example, via a content delivery network (CDN) of the service provider. In other examples, the media assets are made available or delivered to third parties for distributing the media assets or for providing additional services.

Generally, a content publisher (e.g. customer of the service provider) can register for an account by signing up, for example, with the service provider 101 to gain access to media transcoding and processing service. Once an account is created, media assets 108, 109, 124 (e.g. video files) to be transcoded are placed into an input store on the service provider. A workflow can be defined using an application programming interface (API) 123 or console, for example, to initiate a transcoding job which will be carried out using one or more of the compute instances (105, 106, 107). The resulting transcoded object(s) are placed into a defined output store 104 or some other specified location, such as a location on the system of the content publisher 110 or the content receiver 126. Alternatively, the transcoding service can cache the media assets at the network edge and perform the transcoding dynamically on a per-request basis depending on the type of requesting device.

In various embodiments, the media transcoding and processing service 102 can accept media content in a wide variety of incoming formats and can convert the content into a comprehensive collection of output encodings. For example, the transcoding service can transcode to the media to formats suitable for common devices such as Android® and Apple® IOS based devices, Flash®, and HTML5 platforms by providing a set of pre-defined device profiles. The pre-defined profiles can be leveraged by the content publisher when setting up a job via the API 123 or via the graphical console. These profiles can be used as is or modified into a custom profile to be reusable for subsequent transcoding job requests.

The content publisher 110 may be any content creator, content distributor, user generated content publisher, or any other entity that possess media content and desires to make that content available to viewers or other entities. Examples of content creators may be motion picture studios, universities producing educational content, private organizations producing internal video content, and other organizations such as online real estate and auto sales companies producing videos to increase sales. Content distributors may be cable and television service providers, music distributors, movie purveyors and the like. Examples of user generated content publishers may be social media companies, video uploading services, and any other entity that stores content on behalf of its viewers. The content receiver 126 can be any entity that is provided with content 125 that has been transcoded or otherwise processed by the transcoding service. For example, the content receiver 126 may be a third party movie distributor that wishes to provide the transcoded video content on its own website.

In accordance with an embodiment, the service provider 101 can provide a content repository for all types of media files for transcoding and encoding. By focusing on the particular requirements of content publishers (e.g. multiple input types, scale to handle spikes, and a vast range of delivery targets) the transcoding service can provide a solution that can help any type of customer or entity of the service provider.

In accordance with various embodiments, the service provider 101 may implement a number of pricing models for using the service, such as a transcoding service. As one option, the pricing of a transcoding service could be based at least in part on the usage of compute instances (105, 106, 107) that are utilized by the content publisher 110. For example, on-demand transcoding instances can let customers of the service provider pay for compute capacity by the hour that their transcoding instance runs. This can free the content publisher from the costs and complexities of planning, purchasing, and maintaining hardware and transforms what are commonly large fixed costs into much smaller variable costs.

As an alternative option, the content publishers can use reserved transcoding instances. When using reserved transcoding instances, content publishers make a one-time, up-front payment for each transcoding instance they wish to reserve for a long period of time (e.g. 1-3 year term). In return, the customer may be given a discount off the ongoing hourly usage rate for the transcoding instances.

As an alternative option, a set of spot instances could be utilized. In accordance with an embodiment, spot instances enable a content publisher to bid on and purchase unused capacity of the compute instances of other customers at a market place. In some embodiments, instances sold on the spot market may be reclaimed at any moment if they are needed for customers that have previously reserved the computing capacity. Spot instances may be especially useful for handling seasonal or project peak demand and large library re-encodes for new codecs. In some cases, the spot instances may be used for transcoding jobs that are not extremely urgent, because using those instances may incur the risk that other users may be using them and therefore none of the spot instances are available. In other cases, however, using spot instances may be an effective way to get extremely urgent work performed cheaply if there is a significant number of spot instances available. Taking advantage of low bid opportunities for instances, can enable a customer (e.g. content publisher) with pricing advantages they have not been offered without building out transcoding services on their own.

As an alternative option, pricing by gigabyte (or other unit) of transcoded content output may be employed by the transcoding service. In accordance with an embodiment, gigabyte (GB) usage could be calculated by adding the size of the input file and the combined size of the output files. For example, if a 1 GB file were to be transcoded into two formats, each producing a 0.5 GB file, the total amount billed would be 2 GB.

As an alternative option, the transcoding service could charge by output video minutes (e.g. the cumulative minutes of the output transcoded media). Calculation of content length in minutes by the number of output formats could give customers an expectation of what they will be billed. The transcoding service could control the number of unique compute instances that would be launched to support a transcoding job, since licensing costs may be determined by the number of instances launched for a given user.

Figure 2:
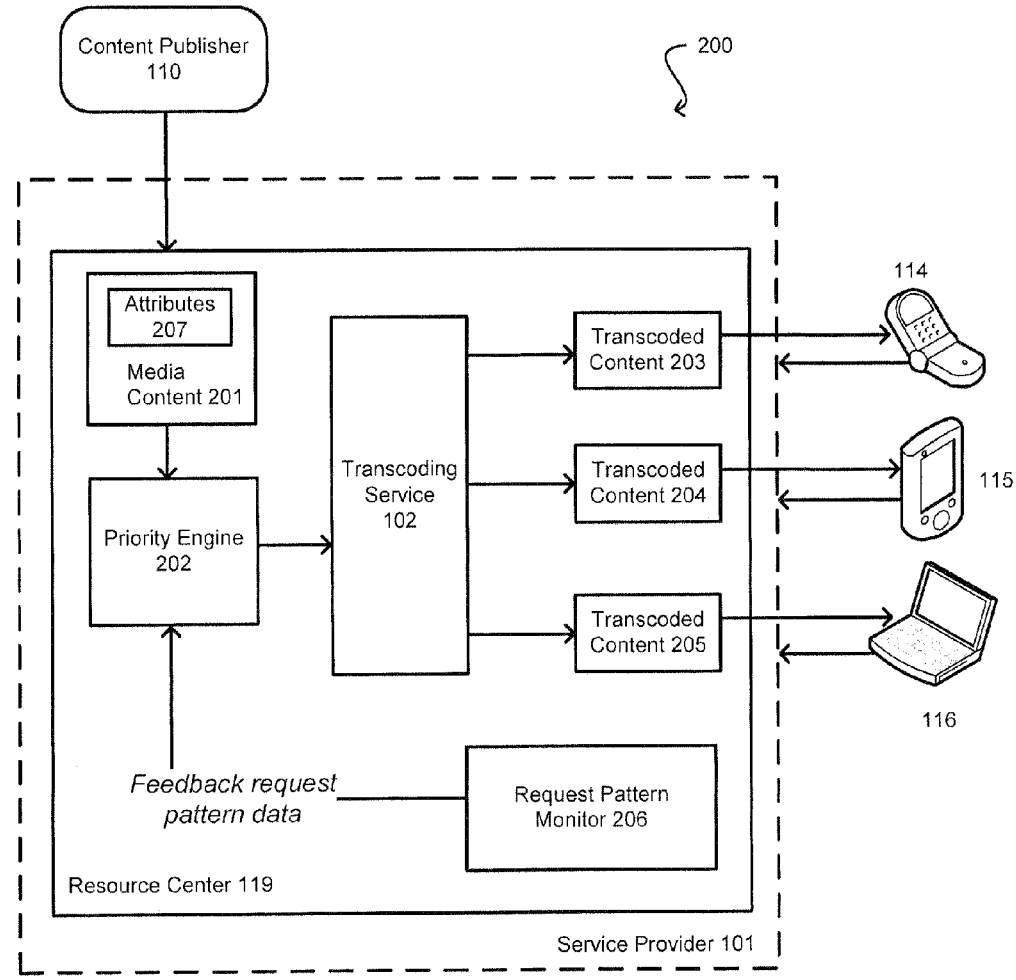
FIG. 2 illustrates an example of a system for prioritizing media transcoding based on request pattern data obtained while serving media content to end users, in accordance with various embodiments.

FIG. 2 illustrates an example of a system 200 for prioritizing media transcoding based on request pattern data obtained while serving media content to end users, in accordance with various embodiments. It should be understood that reference numbers for like components may be carried over between figures for purposes of explanation, but this should not be interpreted as limiting the scope of the various embodiments.

In the illustrated embodiment, the content publisher 110 provides (e.g. uploads) media content 201 to the service provider 101. For example, a media file may be uploaded in a source format and the content publisher may request the service provider to transcode the media file into a plurality of different formats. Some examples of the various media encoding formats may include but are not limited to H.264/MPEG-4 AVC, M-JPEG, MPEG-4, OGG-Theora, VP8-WebM, VC1 (SMPTE), as well as any other media formats and encodings that are known in the art. The media content may also have a set of metadata and other attributes 207 associated therewith. For example, the attributes 207 may indicate the type of media content (e.g. news, movie trailers, music video, etc.), the subject matter (e.g. conversation transcripts, scene descriptions, etc.) and any other information associated with the media content. The attributes 207 may be used to search, classify and compare the media content, identify similarities and relationships with other media content types and the like.

In accordance with an embodiment, once the media content is received, the service provider 101 can utilize a priority assignment engine 202 to assign a priority to the transcoding jobs that will need to be performed on the media content. For example, the transcoding service 102 may transcode the media content into three different encoding formats (203, 204, 205) and each transcoding job may be executed using a different priority (e.g. high, medium, low, priority 1, priority 10, etc.). Based on the priority of the transcoding job, the service provider 101 can assign a different number of resources (e.g. server instances, virtual machines, etc.) or different types of resources to execute each transcoding job. For example, the if a transcoding job to encode the media content into a particular format has been assigned a high priority, the service provider may utilize a greater number of compute instances to execute that job, then other low priority transcoding jobs. As an alternative example, the service provider may utilize a different type or configuration of resources depending on the priority of the job. For example, the service provider may execute high priority transcoding on graphics processing unit (GPU) based resources, while performing lower priority transcoding on regular central processing unit (CPU) based resources. By way of another example, the content publisher 110 may have a number of resource instances reserved and may additionally be provided access to excess computing capacity at a discount. In this situation, the reserved resource instances may be utilized to carry out the high priority transcoding jobs, and the excess capacity resource instances are utilized to execute the low priority transcoding jobs.

In accordance with the illustrated embodiment, the priority can be determined by using a feedback loop to obtain information about the request patterns associated with the media content. In some embodiments, the service provider 101 serves transcoded media content to the various requesting devices (114, 115, 116). In one embodiment, the request pattern monitor 204 can be monitoring the request patterns of various end user devices (114, 115, 116) and recording the historical request pattern information that may later be used with similar media content that may be received from the content publisher 110 or other content publishers in the future. The historical data may include, but is not limited to: the type of devices that are requesting the media content, various device attributes (e.g. CPU, memory capacity) encoding formats associated with those devices, time of day of the requests, location where the requests are originating, connection bandwidth available to the requesting devices, and the like. For example, if a news publisher (e.g. CNN®) issues a daily newscast, the system may monitor various request pattern information for the newscast and determine that during the hours of 8 am and 10 am, a large percentage of requests for that particular newscast is received from mobile devices. This information may be recorded for use with respect to future newscasts of the same kind.

In accordance with an embodiment, based on the collected request pattern information, the priority engine 202 can assign higher priority to the encoding formats that are likely to be requested most frequently by end users. For example, when the system receives new media content 201, it may inspect the attributes of the content and determine a request pattern for the media based at least in part on its attributes 207 and the historical data collected by the system. In various embodiments, the attributes of the media content can include the type of media content, filename, metadata associated with the media content (e.g. subject, topic, etc.), information about the content publisher that submitted the media content, information about the user audience likely to request the media content and the like. The request pattern may indicate which types of devices or encoding formats are most likely to be in high demand at which times for the particular type (or attributes) of media content that has been received. Following the example described above, if the request pattern information indicates that mobile devices will comprise the majority of requests for this particular newscast media, assuming the newscast has ended at 8:00 am for example, the service provider may assign high priorities to the transcodes for mobile device formats. The service provider may initiate all other transcoding jobs at the same time; however, it may assign a lower priority to other transcodes.

In some embodiments, the priority can be assigned based on whether the media content can be transcoded on-the-fly upon receiving a request for the media content from an end user. For example, if the media content can be transcoded dynamically at the time of streaming the content to the requesting end user, the priority engine may choose to assign a lower priority to that media content in order to conserve resources, even if that content is expected to be frequently requested. In alternative embodiments, certain types of transcoding may be assigned higher priority if they can satisfy large numbers of devices but can be performed in a fast manner. For example, some low resolution transcodes may be assigned higher priority because these transcodes can be rendered on many types of devices and can be finished relatively quickly.

It should be noted that while many examples described throughout this disclosure refer to assigning higher or lower priority to certain transcoding jobs, this is not a limitation to all of the embodiments described herein. In some embodiments, the prioritization need not include assigning high or low priorities, but can instead be implemented by performing certain transcoding jobs faster or sooner than other transcoding jobs.

Figure 3:
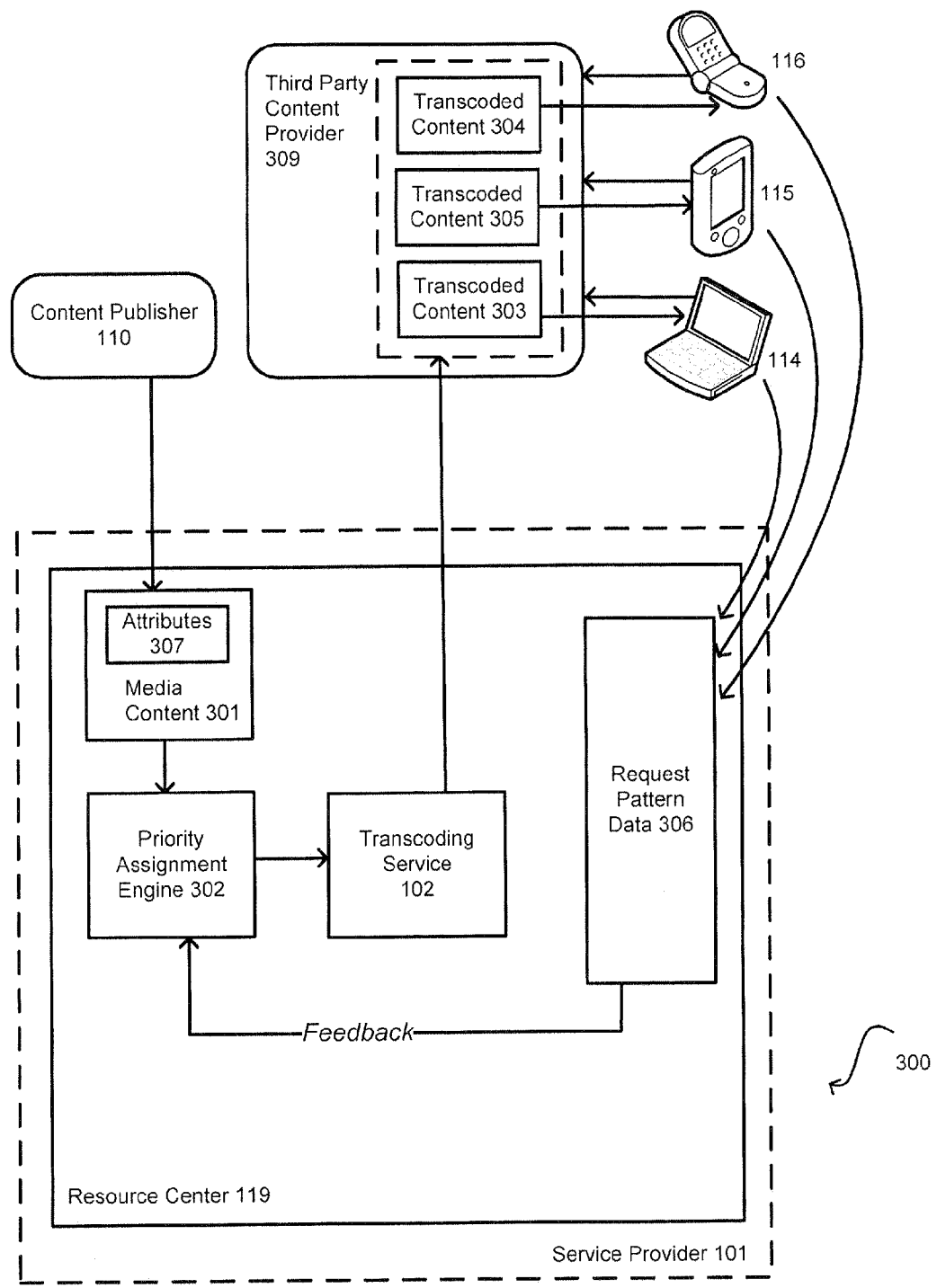
FIG. 3 illustrates an example of a system for prioritizing media transcoding based on request pattern information obtained from mobile devices, in accordance with various embodiments.

FIG. 3 illustrates an example of a system 300 for prioritizing media transcoding based on request pattern data obtained from mobile devices, in accordance with various embodiments.

In the illustrated embodiment, the content publisher 110 provides the media content 301 to the service provider 101 for transcoding, similar to the manner that is described with reference to FIG. 2. The attributes 307 of the media content are inspected and the priority assignment engine 302 assigns a priority to each of transcoding job that will be performed by the transcoding service 102.

In the embodiment of FIG. 3, however, the service provider is not serving the transcoded media content to end user devices (114, 115, 116) itself, but rather delivers the transcoded media content (303, 304, 305) to another entity, such as a third party content provider 309. For example, the content publisher 110 may designate that all of the media content transcoded on behalf of the publisher should be provided to the third party content provider 309 for distribution. The third party content provider 309 can then serve the transcoded content to end users in response to incoming requests. Alternatively, the content publisher 110 itself may receive the transcoded content back if it wishes to serve the content to the various end user devices (114, 115, 116).

In this embodiment, the priority is determined by using a feedback loop which obtains the request pattern information from the end user devices (114, 115, 116) that are requesting the content from the third party content provider 309 (or other location). For example, upon requesting the transcoded media content from the content provider 309, the requesting device may also transmit information about the request (e.g. type of device, type of media content requested, encoding format, etc.) to the service provider 101. This communication of information may be implemented in a variety of ways, including but not limited to: Web Service Application Programming Interface (API) calls (e.g. SOAP), common object request broker architecture (CORBA), wireless messaging or any other form of communication. For example, an application installed on a mobile phone (e.g. iPhone® application) may send a message containing the request information to the service provider whenever the user of the mobile phone requests the media content from any location, such as the system of the third party content provider 309. In one embodiment, the information may be received and stored at the service provider 101.

Based on the information gathered from the devices (114, 115, 116), the service provider 101 may compile a set of historical request pattern data 306. This request pattern data can be analyzed in order to predict which formats and transcoding jobs will be most important (e.g. most requested) at a given time. Based on these predictions, the priority engine 302 can assign priorities to the various transcoding jobs that will be executed on the media content received from the content publisher 110. For example, the priority assignment engine may inspect the attributes 307 of the media content 301 and determine, based on the historical request pattern data 306, that a set of specific encoding formats are most likely to be requested for media content of this type.

In accordance with an alternative embodiment, rather than obtaining actual user device data to make the prediction, the system may either derive or explicitly receive information about similar users to the content publisher's viewing audience. For example, one content publisher may provide very similar content to another content publisher. In that situation, the service provider may obtain the request pattern information about the similar publishers and use that information to derive a transcoding prioritization for the content publisher.

In accordance with an alternative embodiment, prioritization of media can also be based on a combination of time-of-day and geographical information. For example, a follow-the-sun approach may be used to prioritize the transcoding of media content into certain languages. In this embodiment, the system can assign high priority to the transcoding jobs that are likely to be requested based on the assumption that sun will be rising over a particular geographical location next. For example, if the sun is rising over France next, it may be assumed that the media content will soon be requested to be translated into the French language. In one embodiment, the video transcoding may be performed separately from the audio transcoding and the audio may be translated for the media content according to the geographical location combined with the time-of-day. In alternative embodiments, other transcoding jobs may also be prioritized based on the combination of geographic/time information, such as encoding into formats for devices and operating systems that are most prevalent in the geographical area.

Figure 4:
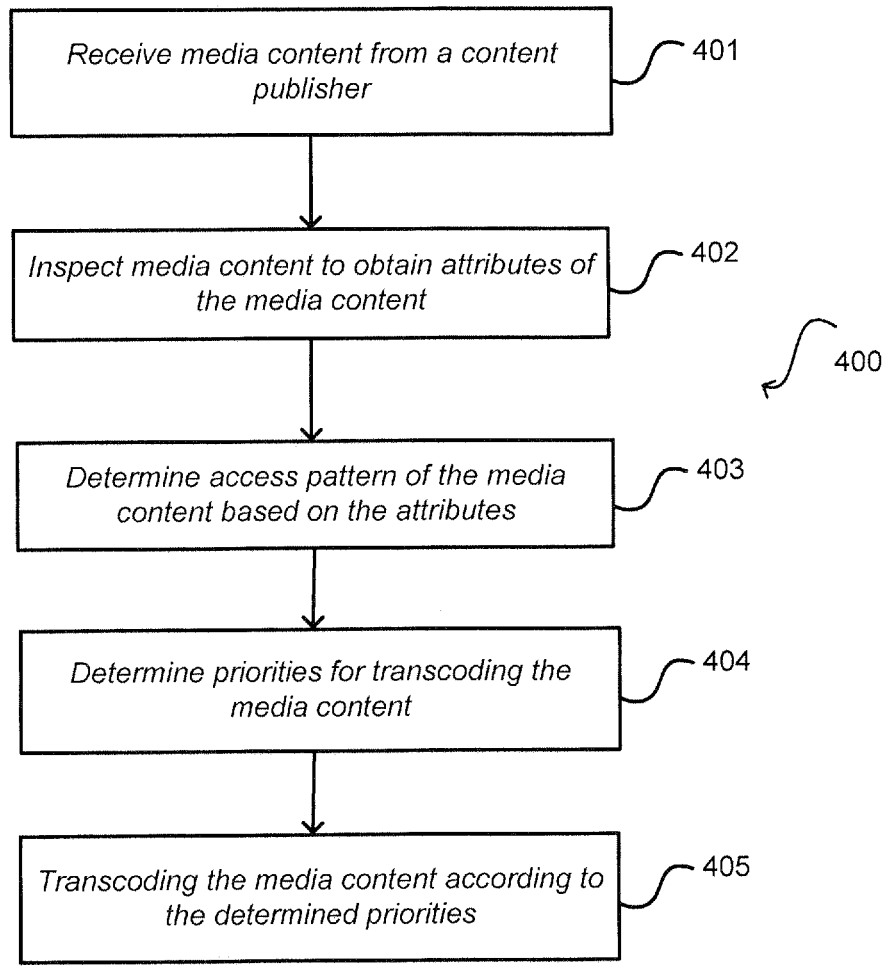
FIG. 4 illustrates an example of a process for prioritizing the transcoding of media content, in accordance with various embodiments.

FIG. 4 illustrates an example of a process 400 for prioritizing the transcoding of media content, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 401, the service provider system receives media content from a content publisher. The media content may be received in a source format and the content publisher may request to transcode the media content into a plurality of different encoding formats. The various formats may be associated with different types of devices, operating systems or applications that employ the formats to render the media to the viewer.

In operation 402, the system inspects the media content and obtains a set of attributes associated with the media content. The attributes may be stored as metadata, derived based on regular expression based on the file name of the media content, retrieved from another location, or obtained in any other manner. In accordance with an embodiment, the attributes of the media content can be used to categorize the media as a particular type of content.

In operation 403, the system can determine request pattern information (e.g. media access pattern) for the media content based on the attributes of the media content. In accordance with an embodiment, the request pattern may be determined by analyzing historical data about which types of encoding formats have been most likely used to request this type of media content. For example, if based on the attributes, the system determines that the media content is a daily newscast received from a particular content publisher, the system may then analyze the historical access patterns associated with that publisher's newscasts released in the past. The historical data may include information about the end user requests for this type of media content, such as types of devices requesting the content, encoding formats, time of day, location and various other factors. In some embodiments, the request pattern may be determined according to factors other than the attributes associated with the media content. For example, the system may determine the request pattern based at least in part on time-of-day, locality or geographical regions where the media content is received from or being delivered to, or the like. These factors may be aggregated over periods of time and may be used to analyze and predict access patterns for media independently of, or in combination with, the attributes associated with the particular media content.

In operation 404, the system determines priorities for the various transcoding jobs that will be performed on the media content. In accordance with an embodiment, the system assigns high priority to the encoding formats that are determined to be most frequently requested based on the analysis of the historic request patterns associated with the media content. The formats that are less frequently requested may be assigned a lower priority. In another embodiment, the system assigns a high priority to the transcoding jobs that have been identified as being more important by the content publisher. In yet another embodiment, the system can assign high priorities to those transcoding jobs that have been determined to be important based on evaluating request patterns associated with content publishers that are deemed to be similar to the content publisher requesting the transcoding.

In operation 405, the system transcodes the media content according to the assigned priorities. In accordance with one embodiment, based on the priority assigned to the transcoding job, a particular number of resources may be assigned to execute the transcoding job. For example, the system may assign 10 resource instances (e.g. virtual machines) to transcode high priority transcoding jobs and 2 resource instances to transcode low priority transcoding jobs. Any permutation of priorities and resources may be utilized within the scope of the embodiments described herein. In an alternative embodiment, the system may utilize a different type or configuration of resources depending on the priority of the job. For example, the system may employ GPU-based resources (or other specialized components) to transcode high priority transcoding jobs, and CPU-based resources to execute low priority transcoding. In accordance with an alternative embodiment, the system may utilize reserved (e.g. always available) resources to transcode the high priority transcoding jobs and excess capacity resources (e.g. periodically available) resources for lower priority transcoding.

Figure 5:
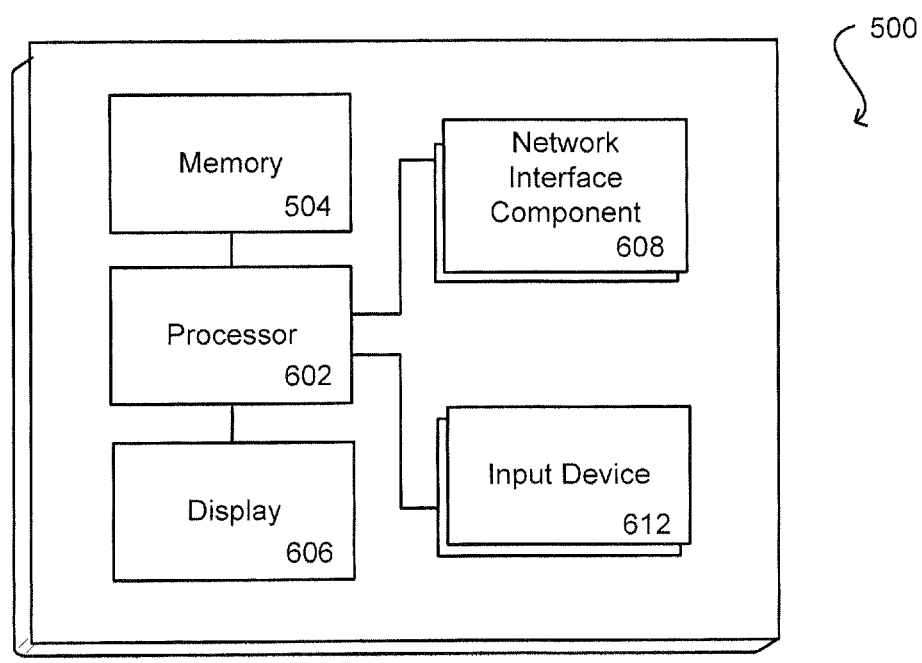
FIG. 5 illustrates a logical arrangement of a set of general components of an example computing device that can be utilized in accordance with various embodiments.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, COI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for prioritizing media transcoding, said method comprising:
    providing, by one or more computing systems, media content to a plurality of users on behalf of a content publisher;
    collecting historical data associated with the serving of the media content to the plurality of users, the historical data including at least one of: a type of device that initiated a request for the media content, a media format associated with the request, a time of the request or a location where the request originated;
    receiving, from the content publisher, a request to reserve a set of reserved resource instances;
    receiving, from the content publisher, new media content to be transcoded from at least one media format into a plurality of different media formats using at least the set of reserved resource instances;
    determining, by the one or more computing systems, a priority for transcoding the new media content into each of the plurality of different media formats based at least in part on the historical data associated with the serving of the media content, wherein determining the priority for transcoding includes:
        determining, based at least in part on the historical data, that a first format has a first probability of being requested and a second format has a second probability of being requested, the second probability being lower than the first probability;
        assigning a first priority to the first format; and
        assigning a second priority, lower than the first priority, to the second format; and
    transcoding, by the one or more computing systems, the new media content from the media format into the plurality of different media formats according to the priority determined for transcoding the new media content, wherein transcoding the new media content includes:
  employing the set of reserved resource instances to perform the transcoding of the new media content into the at least one format assigned the first priority; and
  employing a set of excess capacity resource instances to perform the transcoding of the new media content into the at least one of the plurality of different media formats assigned the second priority.

2. The method of claim 1, wherein transcoding the new media content into the plurality of different formats according to a respective priority further includes:
  employing one or more graphics processing unit (GPU) based resource instances to perform the transcoding of the new media content into the media formats based at least in part on the priority; or
  employing one or more central processing unit (CPU) based resource instances to perform the transcoding of the new media content into the media formats based at least in part on the priority.

3. The method of claim 1, wherein determining priorities for the plurality of different media formats further includes:
  receiving, from the content publisher, information associated with devices that consume the new media content that has been transcoded; and
  assigning priorities to the plurality of different media formats according to the information received from the content publisher.

4. A computer implemented method, comprising:
  receiving, by one or more computing systems, a request to process media content in a source format to produce at least one version of the media content in one or more different formats, the media content to be processed using at least a set of reserved resource instances previously reserved for executing the request;
  collecting, by the one or more computing systems, request pattern information associated with processing the media content and the set of reserved instances previously reserved, the request pattern information comprising historical data including at least one of: a type of device that initiated a historical request for the media content, a media format associated with the historical request, a time of the historical request or a location where the historical request originated;
  assigning priorities for processing the media content into each of the one or more different formats, the priorities being based at least in part on the request pattern information associated with the media content, a first priority being assigned to a first format determined to have a first probability of being requested, and a second priority, lower than the first priority, being assigned to a second format determined to have a second probability of being requested, the first probability being greater than the second probability; and
  processing, by the one or more computing systems, the media content in the source format to produce the at least one version of the media content in the one or more different formats according to at least the assigned priorities, wherein processing the media content includes:
    employing the set of reserved resource instances to perform the processing of the media content into the at least one format assigned to the first priority, and
    employing a set of excess capacity resource instances to perform the processing of the media content into the at least one other format assigned the second priority.

5. The method of claim 4, further comprising:
  receiving at least one request for the version of the media content in the one or more different formats from a user and providing the version to the user; and
  recording the request pattern information for the at least one request based at least in part on one or more of: a type of device that initiated the request for the media content; a format associated with the request; a time of the request; or a location where the request originated.

6. The method of claim 4, further comprising:
  receiving the request pattern information sent by one or more devices upon requesting the media content from a remote location.

7. The method of claim 4, wherein assigning the priorities further includes:
  determining, based at least in part on the request pattern information, which of the one or more different formats are predicted to be requested more frequently than other formats in the one or more different formats; and
  assigning the priorities based at least in part on the determining which of the one or more different formats are predicted to be requested more frequently.

8. The method of claim 4, wherein processing the media content from the source format into the one or more different formats according to at least the assigned priorities further includes:
  transcoding the media content into formats assigned a high priority by using one or more of: a higher number of resources than formats assigned a low priority; a different type of resources than the formats assigned the low priority; a different configuration of resources than the formats assigned the low priority.

9. The method of claim 4, wherein assigning priorities further includes:
  determining at least one of the priorities based at least in part on a combination of geographical information and time-of-day information.

10. The method of claim 4, wherein assigning the priorities further includes:
  assigning a low priority to media content that can be transcoded dynamically upon receiving a request for the media content and providing the media content to an end user device.

11. The method of claim 4, wherein assigning the priorities further includes:
  assigning a high priority for processing the media content into a format that is predicted to be requested more frequently than one or more other formats and that can be completed faster than the one or more other formats.

12. A computing system, comprising:
  at least one processor; and
  memory including, instructions that, when executed by the at least one processor, cause the computing system to:
    receive, by the computing system, media content and a request to transcode the media content to produce at least one version of the media content in one or more different formats, the media content associated with one or more attributes, the request identifying a set of reserved resource instances previously reserved to transcode the media content;
    determine a request pattern associated with processing the media content based at least in part on the one or more attributes, the request pattern information comprising historical data including at least one of: a type of device that initiated a historical request for the media content, a media format associated with the historical request, a time of the historical request or a location where the historical request originated;
initiate, by the computing system, a plurality of transcoding jobs for transcoding the media content;
assign, by the computing system, a priority to each of the transcoding jobs, the priority being based at least in part on the request pattern associated with the media content, a first priority being assigned to a first format determined to have a first probability of being requested, and a second priority, lower than the first priority, being assigned to a second format determined to have a second probability of being requested, the first probability being greater than the second probability; and
execute, by the computing system, the transcoding jobs on the media content based at least in part upon the assigned priorities, wherein executing the transcoding jobs includes:
employing the set of reserved resource instances to perform the transcoding jobs of the media content into the at least one format assigned the first priority, and
employing a set of excess capacity resource instances to perform the processing of the media content into the at least one other format assigned the second priority.

13. The computing system of claim 12, wherein transcoding the media content further includes performing one or more of:
transmuxing the media content; digital watermarking the media content, segmenting the media content, applying access controls to the media content, adding meta data to the media content, inserting advertisements into the media content, translating the media content into one or more languages, transcribing the media content, changing bit rates of the media content, sequencing the media content, changing audio of the media content; or adding audio to the media content.

14. The computing system of claim 12, wherein assigning the priority to each of the transcoding jobs further includes:
determining the priority for at least one of the transcoding jobs based at least in part on a combination of geographical information and time-of-day information.

15. The computing system of claim 12, further comprising instructions that cause the computing system to:
receive at least one request for the transcoded media content from a user and provide the transcoded media content to the user; and
determine the request pattern for the at least one request based at least in part on one or more of: a type of device that initiated the request for the media content; an encoding format associated with the request; a time of the request; or a location where the request originated.

16. The computing system of claim 12, further comprising instructions that cause the computing system to:
receive the request pattern sent by one or more devices upon requesting the media content from a remote location.

17. The computing system of claim 12, wherein assigning the priority further includes:
determining, based at least in part on the request pattern, which of the plurality of transcoding jobs will produce content that is predicted to be requested by a plurality of users more frequently than other transcoding jobs in the plurality of transcoding jobs; and
assigning the priority based at least in part on the determining which of the plurality of transcoding jobs will produce the content that is predicted to be requested more frequently.

18. A non-transitory computer readable storage medium storing one or more sequences of instructions executable by one or more processors to perform a set of operations comprising:
receiving, by one or more computing systems comprising the non-transitory computer readable storage medium and the one or more processors, a request to transcode media content to produce at least one version of the media content in one or more different formats, the media content associated with a set of attributes, the media content to be transcoded using at least a set of reserved resource instances previously reserved to execute the request;
determining a request pattern associated with the media content based at least in part on the set of attributes associated with the media content, the request pattern information comprising historical data including at least one of: a type of device that initiated a historical request for the media content, a media format associated with the historical request, a time of the historical request or a location where the historical request originated;
initiating, by the one or more computing systems comprising the non-transitory computer readable storage medium and the one or more processors, a plurality of transcoding jobs for transcoding the media content;
assigning, by the one or more computing systems comprising the non-transitory computer readable storage medium and the one or more processors, a priority to each of the transcoding jobs, the priority being based at least in part on the request pattern associated with the media, a first priority being assigned to a first format determined to have a first probability of being requested, and a second priority, lower than the first priority, being assigned to a second format determined to have a second probability of being requested, the first probability being greater than the second probability; and
executing, by the one or more computing systems comprising the non-transitory computer readable storage medium and the one or more processors, the transcoding jobs on the media content according to at least the assigned priorities, wherein executing the transcoding jobs includes:
employing the set of reserved resource instances to perform the transcoding jobs of the media into the at least one format assigned the first priority, and
employing a set of excess capacity resource instances to perform the processing of the media into the at least one other format assigned the second priority.

19. The non-transitory computer readable storage medium of claim 18, wherein transcoding the media content further includes performing one or more of:
transmuxing the media content; digital watermarking the media content, segmenting the media content, applying access controls to the media content, adding meta data to the media content, inserting advertisements into the media content, translating the media content into one or more languages, transcribing the media content, changing bit rates of the media content, sequencing the media content, changing audio of the media content; or adding audio to the media content.

20. The non-transitory computer readable storage medium of claim 18, wherein assigning the priority to each of the transcoding jobs further includes:
   determining the priority for at least one of the transcoding jobs based at least in part on a combination of geographical information and time-of-day information.

21. The non-transitory computer readable storage medium of claim 18, further comprising instructions for:
   receiving at least one request for the transcoded media content from a user and provide the transcoded media content to the user; and
   determining the request pattern for the at least one request based at least in part on one or more of: a type of device that initiated the request for the media content; an format associated with the request; a time of the request; or a location where the request originated.

22. The non-transitory computer readable storage medium of claim 18, wherein assigning the priority further includes:
   determining, based at least in part on the request pattern, which of the plurality of transcoding jobs will produce content that is predicted to be requested by a plurality of users more frequently than other transcoding jobs in the plurality of transcoding jobs; and
   assigning the priority based at least in part on the determining which of the plurality of transcoding jobs will produce the content that is predicted to be requested more frequently.

23. The non-transitory computer readable storage medium of claim 18, wherein executing the transcoding jobs further includes:
   executing the transcoding jobs assigned a high priority using one or more of: a higher number of resources than transcoding jobs assigned a low priority; a different type of resources than the transcoding jobs assigned the low priority; a different configuration of resources than the transcoding jobs assigned the low priority.

* * * * *